(12) United States Patent
LePine et al.

(10) Patent No.: US 11,280,644 B2
(45) Date of Patent: Mar. 22, 2022

(54) ADJUSTMENT MEMBER FOR MEASURING DEVICES

(71) Applicant: Ashcroft, Inc., Stratford, CT (US)

(72) Inventors: David F. LePine, Watertown, CT (US); Cyril Baby, Shelton, CT (US); Michael Benjamin Heise, West Haven, CT (US)

(73) Assignee: Ashcroft, Inc., Stratford, CT (US)

( * ) Notice: Subject to any disclaimer, the term of this patent is extended or adjusted under 35 U.S.C. 154(b) by 537 days.

(21) Appl. No.: 16/422,165

(22) Filed: May 24, 2019

(65) Prior Publication Data

US 2020/0370930 A1   Nov. 26, 2020

(51) Int. Cl.
*G01D 11/30*   (2006.01)
*G01L 19/14*   (2006.01)

(52) U.S. Cl.
CPC ............ *G01D 11/30* (2013.01); *G01L 19/147* (2013.01)

(58) Field of Classification Search
CPC .............................. G01D 11/30; G01L 19/147
See application file for complete search history.

(56) References Cited

U.S. PATENT DOCUMENTS 4,476,706 A * 10/1984 Hadden ................ G01N 33/007
                                                    73/1.07

FOREIGN PATENT DOCUMENTS

WO  PCT/US2020/033700     5/2020

OTHER PUBLICATIONS

Product literature brochure for Ashcroft SL17 Submersible Pressure Transmitter, printed Jul. 2017.

* cited by examiner

*Primary Examiner* — Jamel E Williams
(74) *Attorney, Agent, or Firm* — McCarter & McCarter, LLP

(57) ABSTRACT

Disclosed herein are advantageous measuring devices, and systems of the present disclosure and adjustment methods/techniques thereof. The present disclosure provides improved measuring devices (e.g., pressure/temperature measuring devices), and improved systems/methods for adjusting one or more features (e.g., offset and/or span) associated with measuring devices. More particularly, the present disclosure provides sealed measuring devices (e.g., sealed signal conditioning devices, such as sealed pressure transducers or transmitters) having adjustment members (e.g., magnet members) that allow a user to adjust the offset and/or span of the sealed measuring devices. The measuring devices include an adjustment member that allows a user to make adjustments to one or more features of the measuring devices. For example, a sealed pressure transducer can include an magnet member that allows a user to make fine (precision) adjustments of output offset and/or span (e.g., in the field), without breaching the enclosure or housing of the measuring device.

26 Claims, 12 Drawing Sheets

ADJUSTMENT MEMBER FOR MEASURING DEVICES

FIELD OF THE DISCLOSURE

The present disclosure relates to measuring devices (e.g., pressure or temperature measuring devices) and methods for adjusting one or more features (e.g., offset and/or span) associated with measuring devices and, more particularly, to sealed measuring devices (e.g., sealed signal conditioning devices, such as sealed pressure transducers or transmitters) having adjustment members (e.g., magnet members) that allow a user to adjust one or more features (e.g., offset and/or span) of the sealed measuring devices.

BACKGROUND OF THE DISCLOSURE

Measuring devices, such as instruments and signal conditioning devices used for measuring pressure or temperature, have innumerable uses in industry. For example, pressure measuring devices (e.g., transducers, transmitters, digital gauges, etc.) configured to measure the pressure of process media are well known.

Measuring devices are useful in a myriad of different environments for commercial and industrial applications. Typically, pressure measuring devices measure pressure and provide an indication of the value.

In general, it can be very difficult to attempt to adjust the offset and/or the span associated with some measuring devices. For example, certain measuring devices located in hazardous locations should be removed from the hazardous environment before attempting to adjust the offset and/or the span. Some measuring devices require the user to open up a sleeve and utilize a screwdriver to turn potentiometer screws to attempt to adjust offset and/or span.

Other measuring devices require the user to remove name plate screws and the name plate to access buttons or the like to attempt to adjust offset and/or span, and this involves risk (e.g., of exposing the internals of the sealed transmitter, and/or exposing the hazloc to energy). Also, sealed ports are expensive to design and manufacture, and it can be risky to rely on field personnel for re-sealing to meet safety requirements.

Thus, an interest exists for improved systems/methods for adjusting one or more features associated with measuring devices, and related methods of use.

These and other inefficiencies and opportunities for improvement are addressed and/or overcome by the systems, methods and assemblies of the present disclosure.

SUMMARY OF THE DISCLOSURE

The present disclosure provides advantageous measuring devices (e.g., pressure or temperature measuring devices), and improved systems and methods for adjusting one or more features (e.g., offset and/or span) associated with measuring devices. More particularly, the present disclosure provides improved sealed measuring devices (e.g., sealed signal conditioning devices, such as sealed pressure transducers or transmitters) having adjustment members (e.g., magnet members) that allow a user to adjust one or more features (e.g., offset and/or span) of the sealed measuring devices (e.g., without breaching the seals of the measuring device).

The measuring devices include an adjustment member that allows a user to make adjustments to one or more features of the measuring devices. For example, a sealed pressure transducer can include an magnet member that allows a user to make fine (precision) adjustments of output offset and/or span (e.g., in the field), without breaching the enclosure or housing of the measuring device.

The present disclosure provides for a method for adjusting a measuring system including operating a process; mounting a measuring device with respect to the process for measuring a parameter associated with the process; applying power to the measuring device; positioning an adjustment member against or proximal to a target area of the measuring device and within a pre-determined period of time after applying power to the measuring device to place the measuring device in an adjustment mode that enables subsequent adjustment of one or more features of the measuring device via subsequent positioning of the adjustment member against or proximal to the target area; subsequently positioning the adjustment member against or proximal to the target area while the measuring device is in the adjustment mode to adjust one or more features of the measuring device.

The present disclosure also provides for a method for adjusting a measuring system wherein the process is operated under pressure; and wherein the measuring device is a sealed pressure measuring device.

The present disclosure also provides for a method for adjusting a measuring system wherein the measuring device is a pressure measuring device or a temperature measuring device.

The present disclosure also provides for a method for adjusting a measuring system wherein the measuring device is a pressure transducer or a pressure transmitter.

The present disclosure also provides for a method for adjusting a measuring system wherein the measuring device is a sealed signal conditioning device. The present disclosure also provides for a method for adjusting a measuring system wherein the adjustment member is a magnet member. The present disclosure also provides for a method for adjusting a measuring system wherein the measuring device includes a sensing element; and wherein the sensing element is a magnetically sensitive logic input device.

The present disclosure also provides for a method for adjusting a measuring system wherein the pre-determined period of time after applying power to the measuring device is about 30 seconds or less. The present disclosure also provides for a method for adjusting a measuring system wherein the adjustment of the one or more features of the measuring device includes adjusting a digital or analog output of the measuring device. The present disclosure also provides for a method for adjusting a measuring system wherein the adjustment of the one or more features of the measuring device includes adjusting an offset or span of the measuring device. The present disclosure also provides for a method for adjusting a measuring system wherein the adjustment of the one or more features of the measuring device occurs without breaching an enclosure or housing of the measuring device.

The present disclosure also provides for a method for adjusting a measuring system wherein positioning the adjustment member against or proximal to the target area to place the measuring device in the adjustment mode requires a pre-determined sequenced code or placement rhythm of the adjustment member against or proximal to the target area to place the measuring device in the adjustment mode. The present disclosure also provides for a method for adjusting a measuring system wherein the pre-determined sequenced code or placement rhythm includes two or more knocks or placements of the adjustment member against or proximal to the target area to place the measuring device in the adjustment mode.

The present disclosure also provides for a method for adjusting a measuring system wherein the measuring device sends a first signal and a second signal prior to entering the adjustment mode. The present disclosure also provides for a method for adjusting a measuring system wherein the adjustment mode switches between operating or functioning on adjusting a first feature of the measuring device, and operating or functioning on adjusting a second feature of the measuring device, depending on the numerical or percentage value of the parameter of the process that is applied to the measuring device.

The present disclosure also provides for a method for adjusting a measuring system wherein the process is operated under pressure; wherein adjusting the first feature includes adjusting an offset of the measuring device; and wherein adjusting the second feature includes adjusting a span of the measuring device. The present disclosure also provides for a method for adjusting a measuring system wherein the adjustment mode switches between adjusting the first and second features depending on the percent of pressure that is applied to the measuring device.

The present disclosure also provides for a method for adjusting a measuring system wherein when the measuring device is operated in a first parameter range of the process, a first feature of the measuring device can be adjusted by subsequently positioning the adjustment member against or proximal to the target area; and wherein when the measuring device is operated in a second parameter range of the process, a second feature of the measuring device can be adjusted by subsequently positioning the adjustment member against or proximal to the target area.

The present disclosure also provides for a method for adjusting a measuring system wherein the process is operated under pressure; wherein adjusting the first feature includes adjusting an offset of the measuring device; and wherein adjusting the second feature includes adjusting a span of the measuring device. The present disclosure also provides for a method for adjusting a measuring system wherein the first parameter range of the process is from about plus 10% pressure to about minus 10% pressure that is applied to the measuring device; and wherein the second parameter range of the process is about 40% or greater pressure that is applied to the measuring device.

The present disclosure also provides for a method for adjusting a measuring system wherein each subsequent positioning of the adjustment member against or proximal to the target area while the measuring device is in the adjustment mode incrementally adjusts one or more features of the measuring device.

The present disclosure also provides for a method for adjusting a measuring system wherein after a plurality of positive incremental adjustments of the one or more features reaches an upper adjustment limit, the next subsequent positioning of the adjustment member against or proximal to the target area sends the next incremental adjustment to a lower adjustment limit, and then the next subsequent adjustment increments positively from the lower adjustment limit.

The present disclosure also provides for a method for adjusting a measuring system wherein after the measuring device is in the adjustment mode and after a time-frame of inactivity of positioning the adjustment member against or proximal to the target area, the measuring device enters a non-adjustment mode.

The present disclosure also provides for a method for adjusting a measuring system wherein the measuring device sends a first signal and a second signal after entering the non-adjustment mode.

The present disclosure also provides for a method for adjusting a measuring system including operating a process; mounting a measuring device with respect to the process for measuring a parameter associated with the process; applying power to the measuring device; positioning an adjustment member against or proximal to a target area of the measuring device and within a pre-determined period of time after applying power to the measuring device to place the measuring device in an adjustment mode that enables subsequent adjustment of one or more features of the measuring device via subsequent positioning of the adjustment member against or proximal to the target area; subsequently positioning the adjustment member against or proximal to the target area while the measuring device is in the adjustment mode to adjust one or more features of the measuring device; wherein the measuring device is a sealed signal conditioning device; wherein the measuring device sends at least a first signal prior to entering the adjustment mode; wherein when the measuring device is operated in a first parameter range of the process, a first feature of the measuring device can be adjusted by subsequently positioning the adjustment member against or proximal to the target area; wherein when the measuring device is operated in a second parameter range of the process, a second feature of the measuring device can be adjusted by subsequently positioning the adjustment member against or proximal to the target area; wherein each subsequent positioning of the adjustment member against or proximal to the target area while the measuring device is in the adjustment mode incrementally adjusts one or more features of the measuring device; and wherein after the measuring device is in the adjustment mode and after a time-frame of inactivity of positioning the adjustment member against or proximal to the target area, the measuring device enters a non-adjustment mode.

The present disclosure also provides for a method for adjusting a pressure measuring system including operating a process under pressure; mounting a pressure measuring device with respect to the process for measuring pressure associated with the process; applying power to the pressure measuring device; positioning a magnet member against or proximal to a target area of the pressure measuring device and within a pre-determined period of time after applying power to the pressure measuring device to place the pressure measuring device in an adjustment mode that enables subsequent adjustment of offset or span of the pressure measuring device via subsequent positioning of the magnet member against or proximal to the target area; subsequently positioning the magnet member against or proximal to the target area while the pressure measuring device is in the adjustment mode to adjust offset or span of the measuring device; wherein positioning the magnet member against or proximal to the target area to place the pressure measuring device in the adjustment mode requires a pre-determined sequenced code or placement rhythm of the magnet member against or proximal to the target area to place the pressure measuring device in the adjustment mode; wherein the adjustment of the offset or span of the pressure measuring device occurs without breaching an enclosure or housing of the pressure measuring device.

Any combination or permutation of embodiments is envisioned. Additional advantageous features, functions and applications of the disclosed systems, methods and assemblies of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the scope of the present disclosure. To assist those of ordinary skill in the art in making and using the disclosed systems, methods and assemblies, reference is made to the appended figures, wherein.

DETAILED DESCRIPTION OF DISCLOSURE

Figure 1:
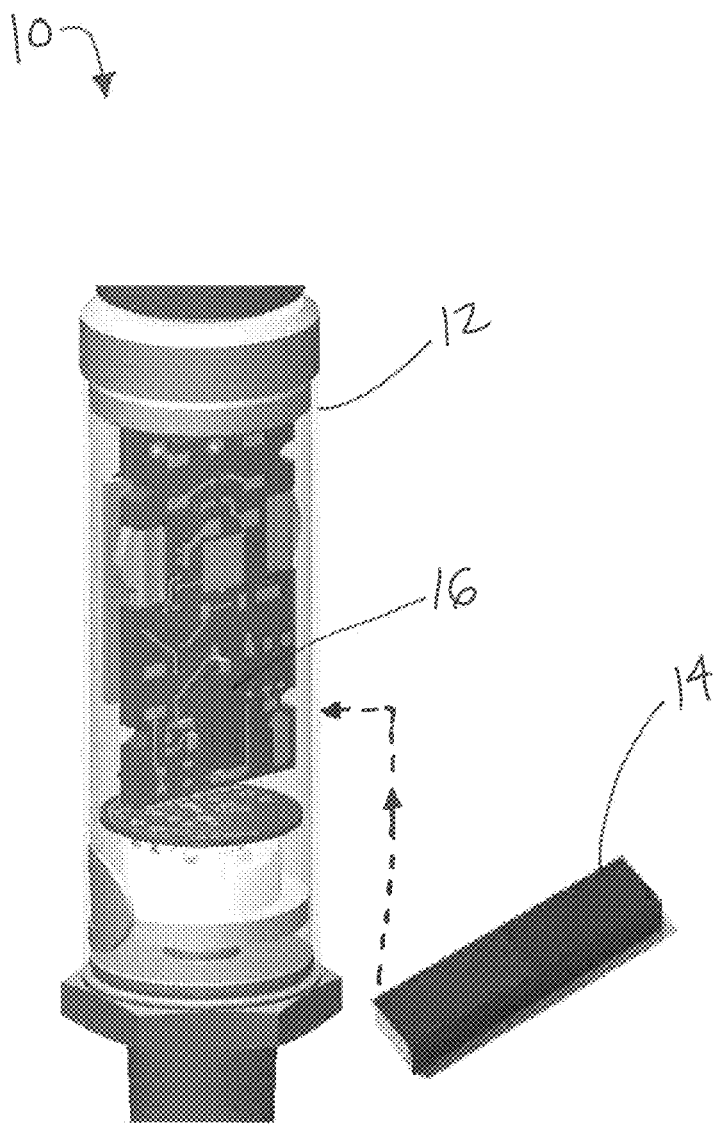
FIG. 1 is a side view of an exemplary measuring device and adjustment member, according to the present disclosure.

The exemplary embodiments disclosed herein are illustrative of advantageous measuring devices (e.g., pressure or temperature measuring devices), and systems of the present disclosure and adjustment methods/techniques thereof. It should be understood, however, that the disclosed embodiments are merely exemplary of the present disclosure, which may be embodied in various forms. Therefore, details disclosed herein with reference to exemplary measuring devices/adjustment methods and associated processes/techniques of assembly and use are not to be interpreted as limiting, but merely as the basis for teaching one skilled in the art how to make and use the advantageous measuring devices/methods and/or alternative measuring devices/methods of the present disclosure.

The present disclosure provides improved measuring devices (e.g., pressure or temperature measuring devices), and improved systems and methods for adjusting one or more features (e.g., offset and/or span) associated with measuring devices. More particularly, the present disclosure provides advantageous sealed measuring devices (e.g., sealed signal conditioning devices, such as sealed pressure transducers or transmitters) having adjustment members (e.g., magnet members) that allow a user to adjust one or more features (e.g., offset and/or span) of the sealed measuring devices.

Current practice provides that it can be very difficult to attempt to adjust the offset and/or the span associated with some measuring devices. As an example, some conventional measuring devices are located in hazardous locations and should be removed from the hazardous environment before attempting to adjust the offset and/or the span. Both HazLoc (ATEX) and Functional Safety standards often require that any field adjustment (or modification) requires a tool to allow access for any changes—so that the action must be deliberate. Certain conventional measuring devices require the user to open up a sleeve and utilize a screwdriver to turn potentiometer screws to attempt to adjust offset and/or span. Some other conventional measuring devices require the user to remove name plate screws and the name plate to access buttons or the like to attempt to adjust offset and/or span.

In exemplary embodiments, the present disclosure provides for improved systems/methods for adjusting one or more features (e.g., offset and/or span) of measuring devices (e.g., sealed signal conditioning devices, such as sealed pressure transducers or transmitters) by utilizing adjustment members (e.g., magnet members) to adjust the offset and/or span of the measuring devices, thereby providing significant operational, manufacturing and commercial advantages as a result.

Referring now to the drawings, like parts are marked throughout the specification and drawings with the same reference numerals, respectively. Drawing figures are not necessarily to scale and in certain views, parts may have been exaggerated for purposes of clarity.

As shown in FIG. 1, there is illustrated a measuring device 10 depicting an embodiment of the present disclosure. Exemplary measuring device 10 takes the form of a pressure or temperature measuring device 10 or the like, although the present disclosure is not limited thereto.

More particularly, exemplary measuring device 10 takes the form of a sealed measuring device 10 (e.g., a sealed signal conditioning device 10, such as a sealed pressure transducer 10 or transmitter 10). Measuring device 10 is configured and dimensioned to be mounted with respect to a process for measuring a parameter associated with the process (e.g., a pressure transducer/transmitter 10 configured to measure the pressure of process media or the like).

In general, measuring device 10 (e.g., sealed pressure transducer 10) includes an adjustment member 14 (e.g., magnet member 14) that allows a user to make adjustments to one or more features (e.g., offset and/or span) of measuring device 10.

For example, sealed pressure transducer 10 can include an adjustment member 14 (e.g., magnet member 14) that allows a user to make fine (precision) adjustments of output offset and/or span (e.g., in the field), without breaching the enclosure or housing 12 of the measuring device 10.

In exemplary embodiments, by utilizing a magnet member 14 (e.g., a small magnet member 14, similar to one located on the end of a screwdriver), and tapping/contacting or placing the magnet member 14 against or proximal to the housing 12 in a designated or target area of the housing 12 within a pre-determined period of time (e.g., within about 30 seconds; within about 10 seconds; etc.) of applying power to the measuring device 10, then the output (e.g., analog and/or digital output) of the measuring device 10 will increment in (small) steps via sensing element 16 of measuring device 10 (e.g., via a reed switch 16 centrally located within measuring device 10) via subsequent taps/knocks/placement of the magnet member 14 against or proximal to the housing 12. In certain embodiments, the output of the measuring device 10 will thereafter automatically progress and advance in speed if the magnet member 14 is held in place (e.g., greater than 2 or 3 seconds; etc.) against or proximal to the designated/target area of the housing 12.

In other embodiments, it is noted that adjustment member 14 can take the form of a rotating ring 14 (e.g., around the housing 12) or magnetic wheel 14 or the like, and such adjustment member 14 could be used to facilitate alternating magnetic pulses (e.g., replicating taps/knocks/placement of the adjustment member 14 against or proximal to the housing 12).

In exemplary embodiments, the sensing element 16 is a magnetically sensitive (digital) logic input device (e.g., a magnetic switch 16, but can be replaced or enhanced with a Hall effect or GMR sensor 16 for a more complex magnetic input method).

In certain embodiments, it is noted that multiple sensing elements 16 of measuring device 10 (e.g., multiple reed switches 16) can provide additional remote logic inputs for added function or communication of input.

In other embodiments, Hall effect sensors 16 or GMR (giant magnetoresistance) devices 16 can substitute (as alternatives to a reed switch 16) to provide proportional (not just logic) input—even facilitating a magnetic communication input to serve as a heuristic input for adjustment or configuration.

In other embodiments, it is noted that sensing element 16 can also take the form of: a tactile switch (e.g., without magnet member 14—manually operated); a percussive sensor (e.g., piezoelectric or microphone)—to detect "taps" or the like on/near the housing 12; a position switch; an optical switch/sensor or other magnetic sensors such as Wiegand effect device, GMR (giant magnetoresistance), or Hall Effect sensors 16.

As discussed further below, security for the measuring device 10 can be provided by requiring a fixed or pre-determined sequenced code or knocking/tapping/placement rhythm/sequence of the adjustment member 14 (e.g., magnet member 14) against or proximal to the housing 12 to enable the subsequent adjustment of offset and/or span of measuring device 10 via magnet member 14 (e.g., two knocks/taps/placement of the magnet member 14 against or proximal to housing 12; three knocks/taps/placement of the magnet member 14 against or proximal to housing 12; a plurality of certain knocks/taps/placement of the magnet member 14 against or proximal to housing 12; etc.). Such a requirement for the fixed or pre-determined sequenced code or knocking/tapping/placement rhythm of the magnet member 14 against or proximal to the housing 12 to enable the subsequent adjustment of one or more features of the measuring device 10 (e.g., offset and/or span) can prevent inadvertent or unauthorized calibration or adjustment of the measuring device 10.

In an example, a measuring device 10 (e.g., pressure transducer/transmitter 10) can be mounted with respect to a process for measuring a parameter (e.g., pressure) associated with the process.

Power can then be applied to the measuring device 10.

Within a pre-determined period of time after applying power to the measuring device 10 (e.g., within about 30 seconds; within about 10 seconds; etc.), a magnet member 14 can be tapped or contacted/placed/positioned (e.g., using the correct knock-on or tapping security code/rhythm/sequence) against or proximal to the housing 12 in a pre-determined or target area of the housing 12 (e.g., indicated on a label or the like of the housing) to place the measuring device into an adjustment mode that enables the subsequent adjustment of one or more features (e.g., offset and/or span) of measuring device 10 via subsequent contact or placement of magnet member 14 against or proximal to measuring device 10 (e.g., against or proximal to the target area of the housing 12).

As noted above, security for the measuring device 10 can be provided by requiring a fixed or pre-determined sequenced code or knocking/tapping/placement rhythm/sequence of the magnet member 14 against or proximal to the housing 12 to place the measuring device into an adjustment mode that enables the subsequent adjustment of one or more features (e.g., offset and/or span) of measuring device 10 via further contact or placement of magnet member 14 with respect to measuring device 10.

The measuring device 10 then responds (after the correct knock-on or tapping security code/rhythm/placement against or proximal to the housing 12 has been applied at the designated area and within the pre-determined period of time after supplying power to the measuring device 10) by sending a first signal (e.g., a high current) and then a second signal (e.g., a low current), and thereafter enters the adjustment mode. For example, the analog output of measuring device 10 can annunciate a successful adjustment mode entry by briefly going high then low within a few seconds. It is noted that measuring device 10 may just send one signal, or may send a plurality of signals to signify entering the adjustment mode.

While in the adjustment mode, a user can then utilize the magnet member 14 to tap or knock/place the magnet member 14 against or proximal to the housing 12 at the designated area to make adjustments to the output (e.g., increment the offset or span of the analog output) of the measuring device 10.

In exemplary embodiments, the adjustment mode of the measuring device can switch between operating or functioning on adjusting/changing a first feature of the measuring device 10 (e.g., a "Zero" or "Offset" adjustment to measuring device 10), and operating or functioning on adjusting/changing a second feature of the measuring device 10 (e.g., a "Span" adjustment to measuring device 10), depending on the numerical or percentage value of the parameter of the process that is applied to the measuring device 10 (e.g., depending on what actual pressure that is applied to the measuring device 10).

Stated another way, the adjustment mode of exemplary measuring device 10 can switch between: (i) operating on "Zero" or "Offset" adjustments to measuring device 10, and (ii) operating on "Span" adjustments to measuring device 10, depending on what the actual pressure (e.g., percent of pressure) that is applied to measuring device 10.

For example, if the measuring device 10 is operated in a first parameter range of the process (e.g., from about plus 10% pressure to about minus 10% pressure that is applied to measuring device 10; from about plus 20% pressure to about minus 20% pressure that is applied to measuring device 10; from about plus 30% pressure to about minus 10% pressure that is applied to measuring device 10; etc.), each subsequent distinct tap or knock/placement of the magnet member 14 against or proximal to the housing 12 in the designated area will affect the output offset zero of the measuring device 10.

Stated another way, if the actual pressure applied to measuring device 10 is within a first parameter range (e.g., plus/minus 10%), each tap/knock/placement of the magnet member 14 against or proximal to housing 12 will affect the output offset zero of the measuring device (e.g., increment the offset of the analog output of device 10).

Likewise, if the measuring device 10 is operated in a second parameter range of the process (e.g., at about 40% or greater pressure that is applied to measuring device 10; at about 50% or greater pressure that is applied to measuring device 10; etc.), each subsequent distinct tap or knock/placement of the magnet member 14 against or proximal to the housing 12 in the designated area will affect the output span gain of the measuring device 10 (e.g., increment the span of the analog output of device 10).

Stated another way, if the actual pressure applied to measuring device 10 is within a second parameter range (e.g., at about 40% or greater pressure that is applied to measuring device 10), each tap/knock/placement of the magnet member 14 against or proximal to housing 12 will affect the output span gain of the measuring device.

In exemplary embodiments, the adjustments to the output (offset and/or span) of the measuring device 10 increase in increments in a positive direction (e.g., by each subsequent tap/knock/placement of the magnet member 14 against or proximal to housing 12), and once each adjustment has hit an upper adjustment limit, the adjustments to the output rolls over to a lower adjustment limit (e.g., lower adjustment limit of offset or span), and then increments positive from the lower adjustment limit (e.g., by each subsequent tap/knock/placement of the magnet member 14 against or proximal to housing 12).

For example, the upper adjustment limit can be plus 10% output change, and the lower adjustment limit can be minus 10% output change, although the present disclosure is not limited thereto. Rather, it is noted that other desired upper and/or lower adjustment limits can be utilized (e.g., plus/minus 5% output change, plus/minus 15% output change, etc.).

The incremental adjustments (e.g., by each subsequent tap/knock/placement of the magnet member 14 against or proximal to housing 12) to the output (e.g., offset or span) can be any suitable incremental number (e.g., 0.01% output change; 0.10% output change; 1% output change; 2% output change; 3% output change; etc.).

Again, it is noted that in certain embodiments, the output of the measuring device 10 will thereafter automatically progress and advance in speed if the magnet member 14 is held in place (e.g., greater than 2 or 3 seconds; etc.) against or proximal to the designated/target area of the housing 12 (e.g., the incremental adjustment to the output will speed up).

Stated another way and in one embodiment, tapping/placing the magnet 14 in or proximal to the target area on the transducer 10 will continue to increase the offset (or span), slowly at first, then increasing speed, until the output change is plus 10%, at which time any further input taps/placements of the magnet 14 will roll over the adjustment to minus 10%, and then continue to increase incrementally.

It is noted that an opposite adjustment direction can be configured for measuring device 10, with the adjustments to the output (offset and/or span) of the measuring device 10 decrease in increments in a negative direction (e.g., by each subsequent tap/knock/placement of the magnet member 14 against or proximal to housing 12), and once each adjustment has hit a lower adjustment limit, the adjustments to the output rolls over to an upper adjustment limit (e.g., upper adjustment limit of offset or span), and then increments negative from the upper adjustment limit (e.g., by each subsequent tap/knock/placement of the magnet member 14 against or proximal to housing 12).

FIGS. 2-8 show graphs depicting adjusting the offset of an exemplary measuring device 10 of the present disclosure.

In general, one can utilize adjustment member 14 for adjusting the measuring device 10 readings at zero pressure (Offset adjustment).

Figure 2:
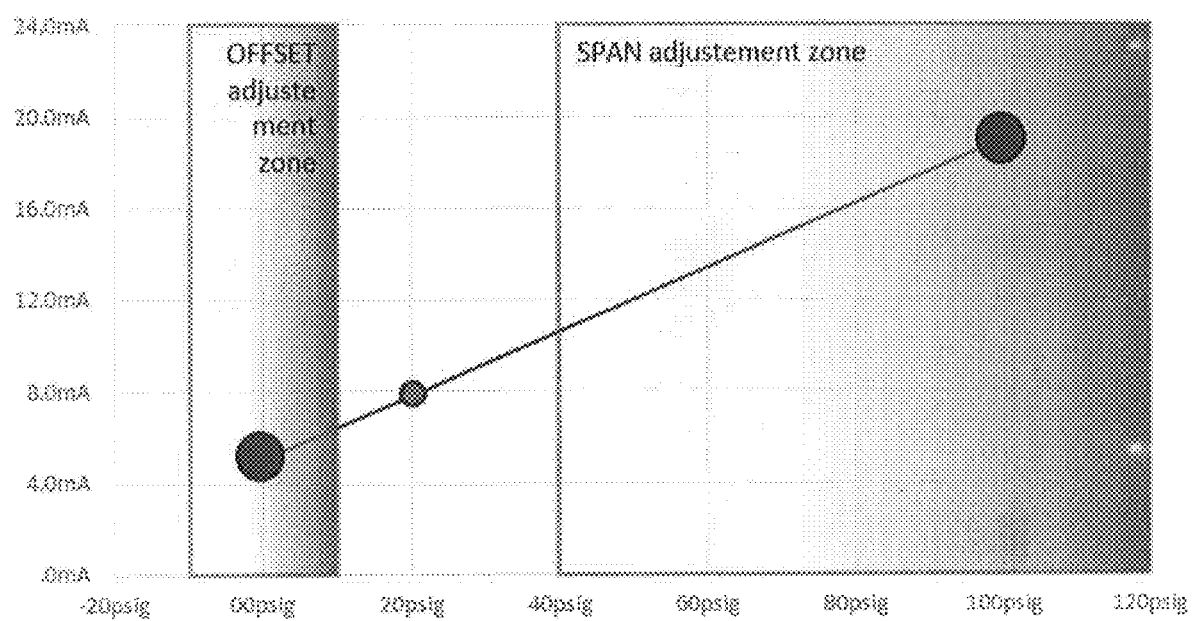
FIGS. 2-8 show graphs depicting adjusting the offset of an exemplary measuring device of the present disclosure.

FIG. 2 depicts a graph showing the output of a measuring device 10 that is configured to be a 4 mA to 20 mA pressure transducer 10, with 4 mA configured to be a zero psi pressure reading, and 20 mA configured to be the maximum range of the pressure transducer 10 and is configured to correspond to a 100 psi pressure reading.

Figure 3:
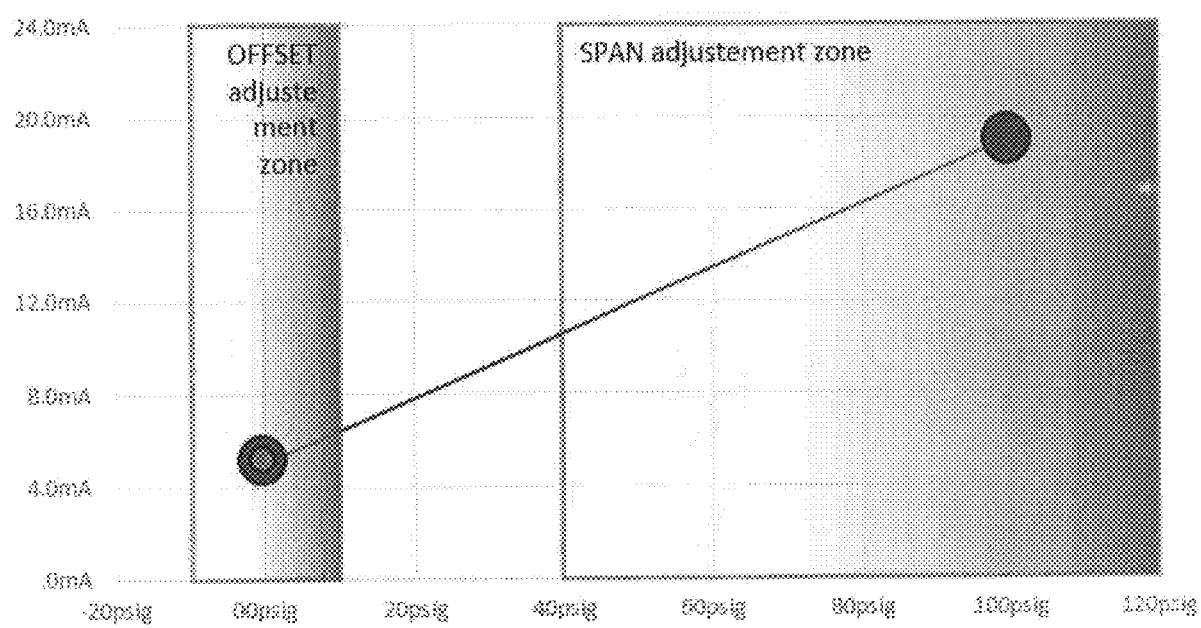

As shown in FIG. 2, the measuring device 10 can be operated at 20 psi. To adjust the offset output of measuring device 10, a user would first decrease the applied pressure on the measuring device 10 to within a first parameter range of the process (e.g., from about plus 10% pressure to about minus 10% pressure that is applied to measuring device 10), as shown in FIG. 3 (pressure is brought down to zero psi).

The power to the transducer 10 can be turned off, and then turned back on.

Within a pre-determined period of time after applying power to the measuring device 10 (e.g., within about 30 seconds; within about 10 seconds; etc.), a magnet member 14 can be tapped or contacted/placed/positioned (e.g., using the correct knock-on or tapping security code/rhythm/sequence) against or proximal to the housing 12 in a pre-determined or target area of the housing 12 to place the measuring device into an adjustment mode that enables the subsequent adjustment of offset (because the measuring device 10 is being operated within a first parameter range of the process) of measuring device 10 via subsequent contact or placement of magnet member 14 against or proximal to measuring device 10 (e.g., against or proximal to the target area of the housing 12).

Figure 4:
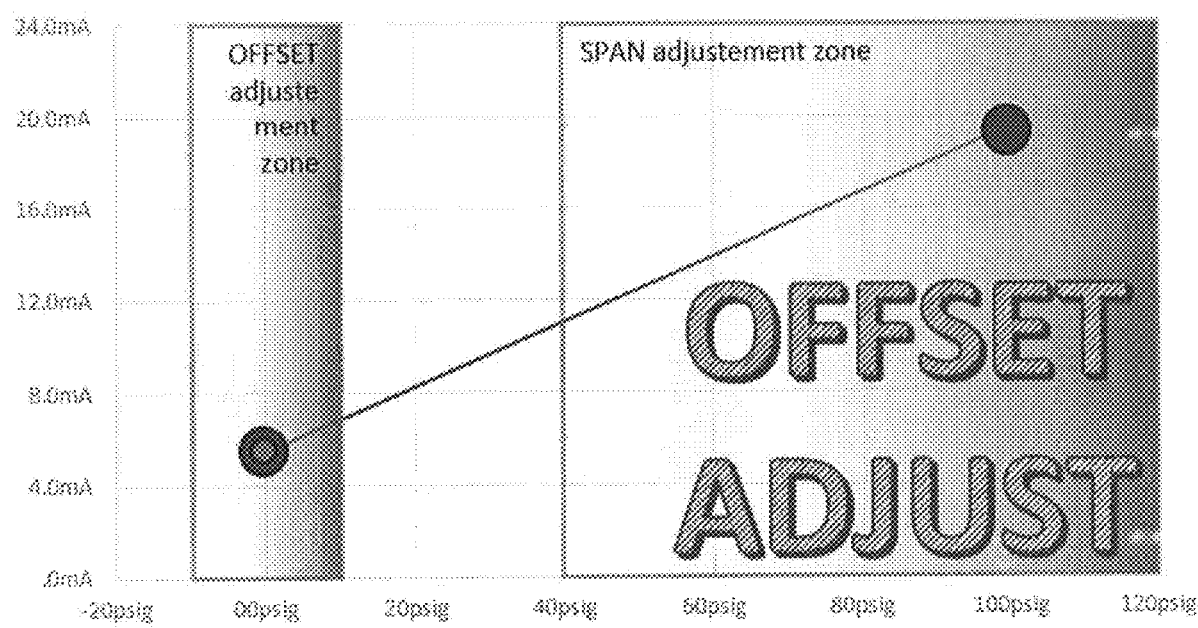
Figure 5:
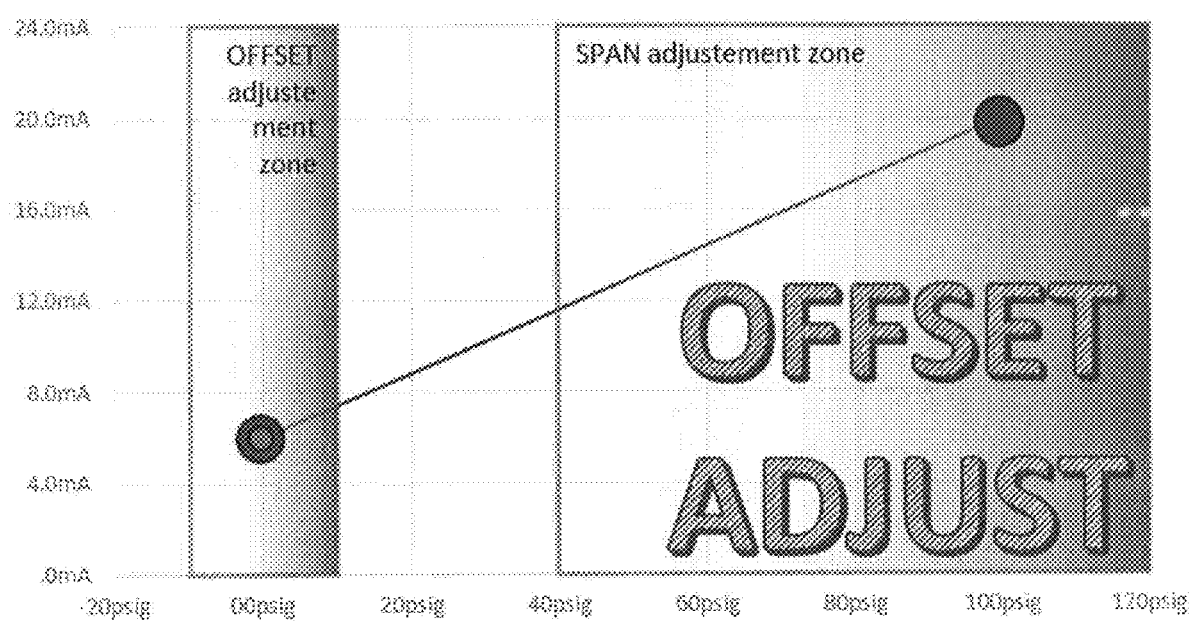

Thereafter, subsequent tapping or holding the magnet member 14 against or proximal to measuring device 10 increments output offset, as shown in FIGS. 4 and 5.

Figure 6:
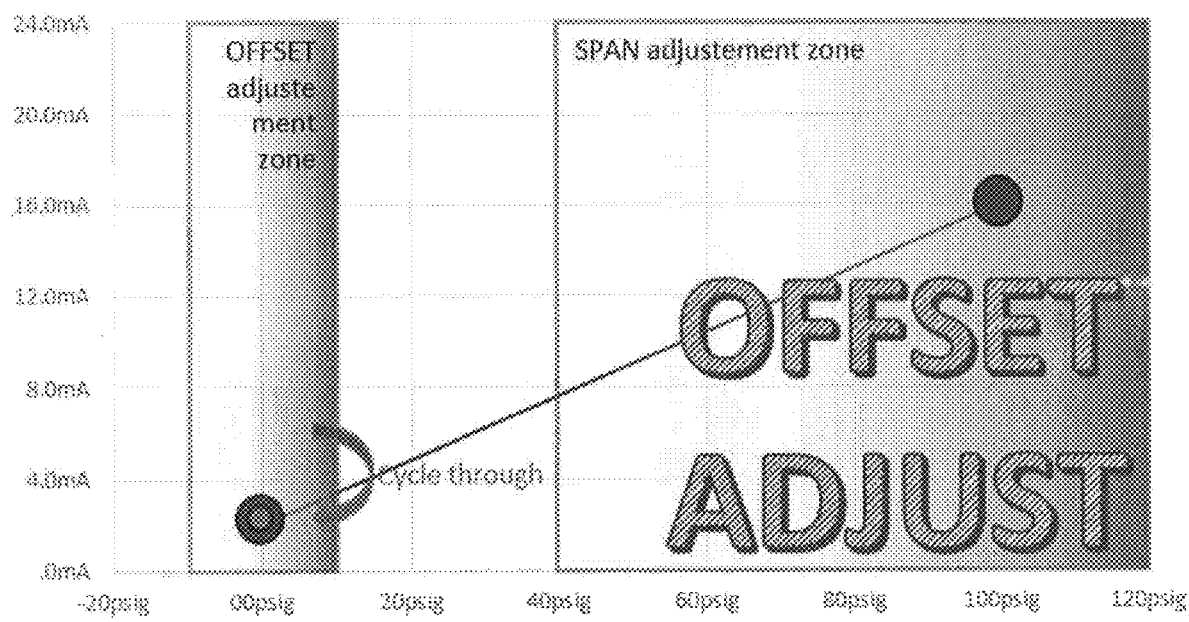
Figure 7:
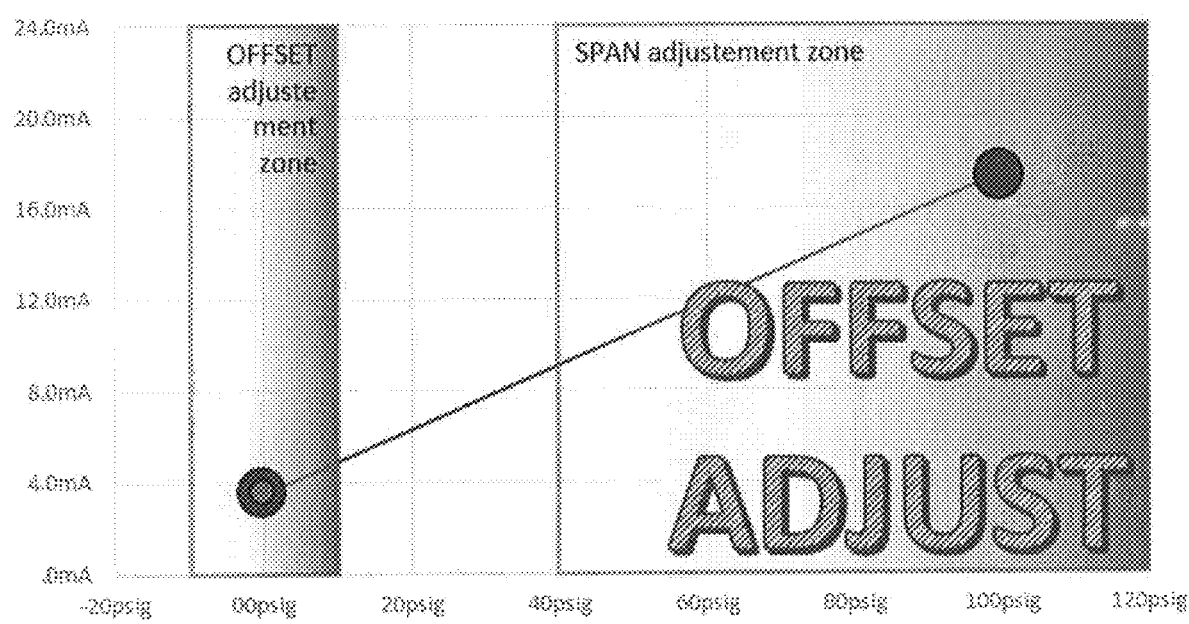
Figure 8:
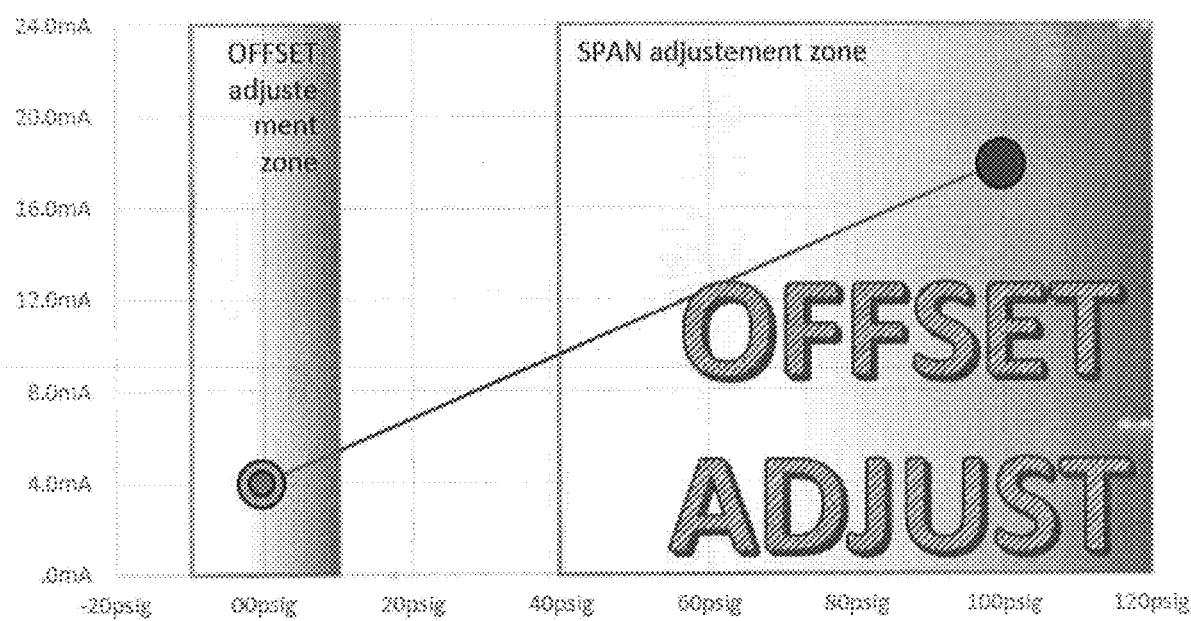

Once each subsequent adjustment has hit an upper adjustment limit, the adjustments to the output rolls over to a lower adjustment limit (e.g., lower adjustment limit of offset—as shown in FIG. 6), and then increments positive from the lower adjustment limit as shown in FIGS. 7 and 8 (e.g., by each subsequent tap/knock/placement of the magnet member 14 against or proximal to housing 12).

FIG. 8 depicts the output offset of measuring device 10 being re-calibrated to zero psi at 4 mA of measuring device 10 (e.g., within plus or minus 0.01% error).

After re-calibrating to zero psi at 4 mA of measuring device 10, a user can remove the adjustment member from housing 14 and wait a pre-determined period of time (e.g., after about 30 seconds of last contact/placement of the magnet member 14 against or proximal to housing 12; after about 10 seconds of last contact/placement of the magnet member 14 against or proximal to housing 12; etc.).

The measuring device 10 then responds (after waiting the pre-determined period of time) by sending a first signal (e.g., a high current) and then a second signal (e.g., a low current), and thereafter exits the adjustment mode (e.g., enters a non-adjustment mode). It is noted that measuring device 10 may just send one signal, or may send a plurality of signals to signify exiting the adjustment mode.

Stated another way, after waiting the pre-determined period of time (e.g., about 30 seconds) of inactivity (in terms of the magnetic 14 input), any changes made to the offset or span (or both) of the output (e.g., analog output) are stored permanently in non-volatile memory of measuring device 10, and the output annunciates this by briefly going high then low within a few seconds.

FIGS. 9-12 show graphs depicting adjusting the span of an exemplary measuring device 10 of the present disclosure.

In general, one can utilize adjustment member 14 for adjusting the measuring device 10 readings at a higher pressure by changing the output scale (Span adjustment).

Figure 9:
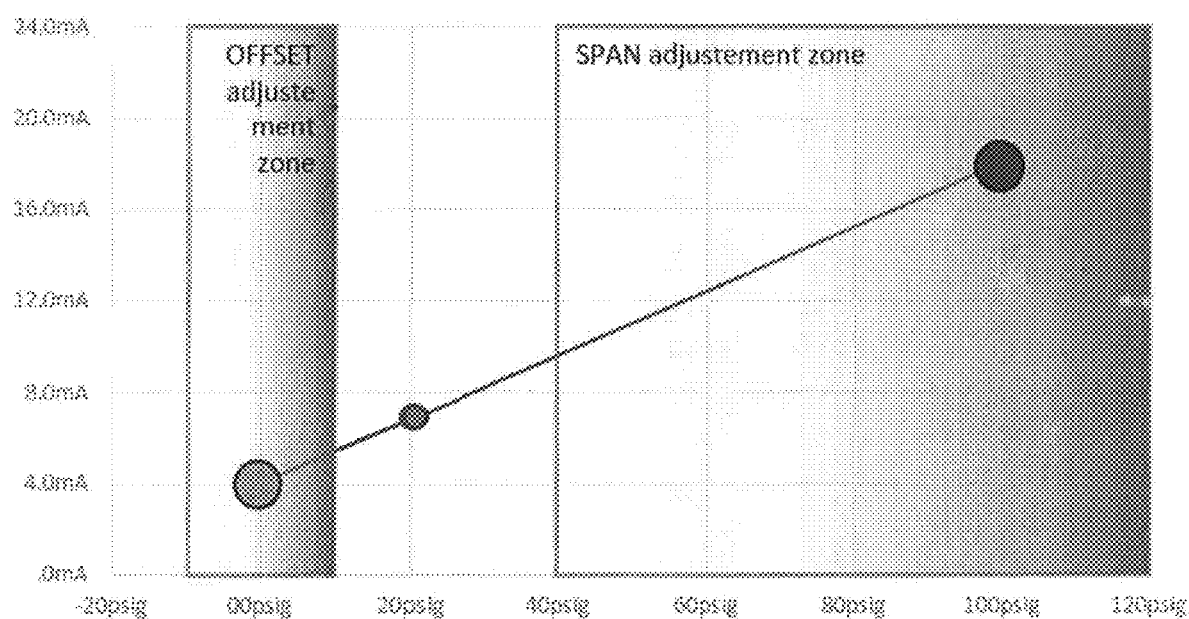
FIGS. 9-12 show graphs depicting adjusting the span of an exemplary measuring device of the present disclosure.

FIG. 9 depicts a graph showing the output of a measuring device 10 that is configured to be a 4 mA to 20 mA pressure transducer 10, with 4 mA configured to be a zero psi pressure reading, and 20 mA configured to be the maximum range of the pressure transducer 10 and is configured to correspond to a 100 psi pressure reading.

Figure 10:
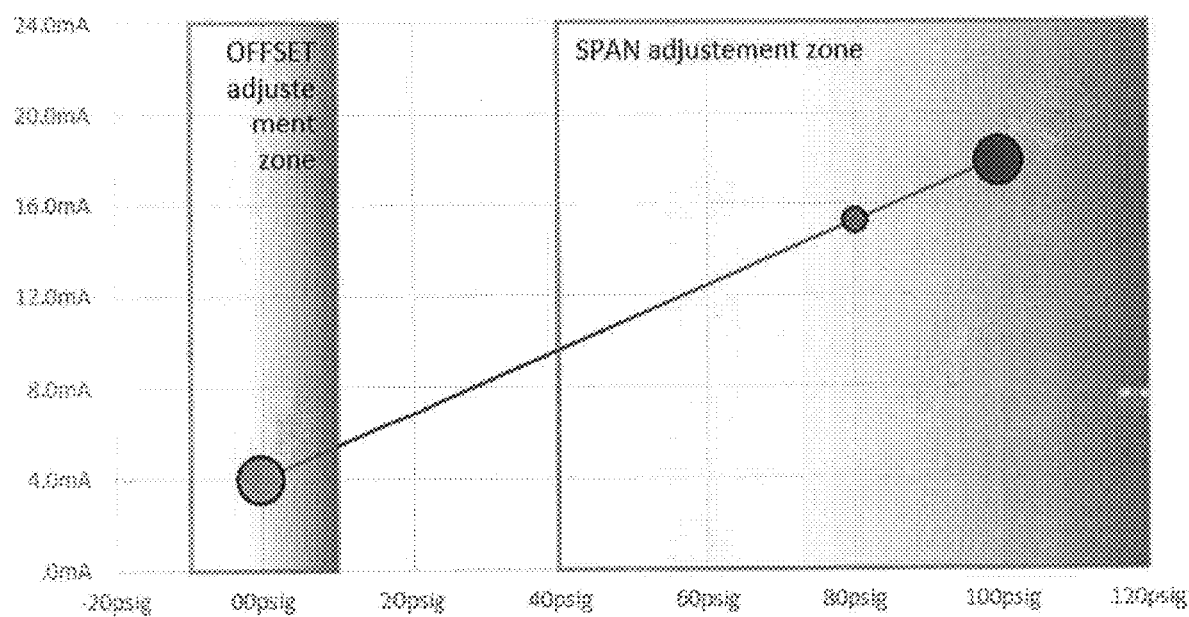

As shown in FIG. 9, the measuring device 10 can be operated at 20 psi. To adjust the span output of measuring device 10, a user would first increase the applied pressure on the measuring device 10 to within a second parameter range of the process (e.g., e.g., at about 40% or greater pressure that is applied to measuring device 10; etc.), as shown in FIG. 10 (pressure is brought up to 80 psi).

The power to the transducer 10 can be turned off, and then turned back on.

Within a pre-determined period of time after applying power to the measuring device 10 (e.g., within about 30 seconds; within about 10 seconds; etc.), a magnet member 14 can be tapped or contacted/placed/positioned (e.g., using the correct knock-on or tapping security code/rhythm/sequence) against or proximal to the housing 12 in a pre-determined or target area of the housing 12 to place the measuring device into an adjustment mode that enables the subsequent adjustment of span (because the measuring device 10 is being operated within a second parameter range of the process) of measuring device 10 via subsequent contact or placement of magnet member 14 against or proximal to measuring device 10 (e.g., against or proximal to the target area of the housing 12).

Figure 11:
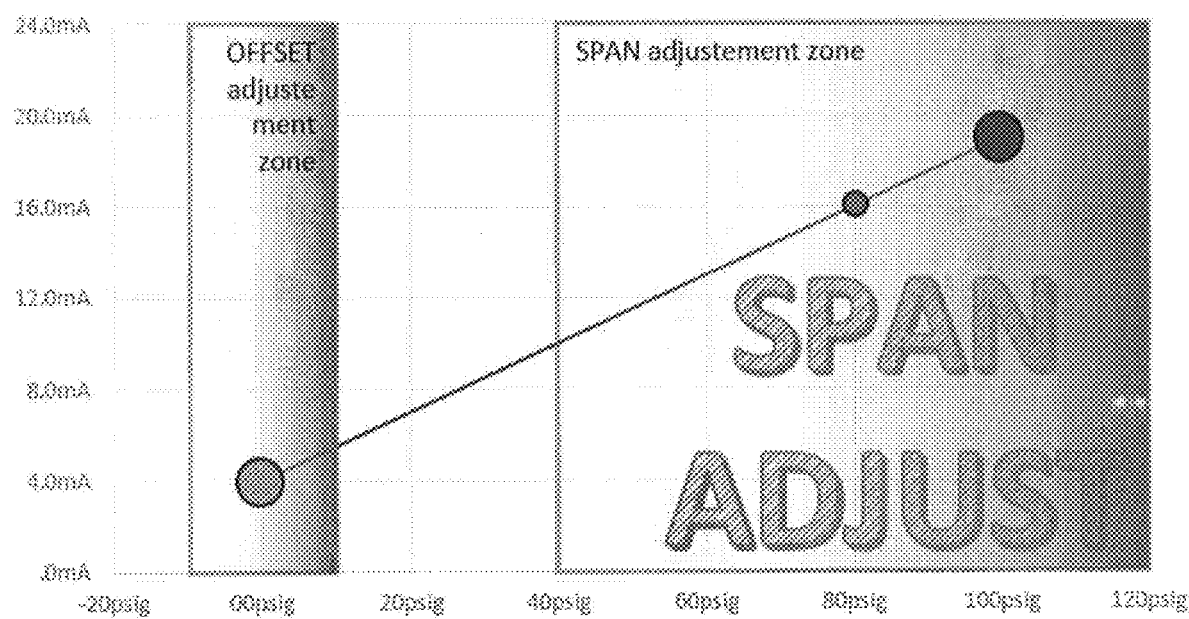
Figure 12:
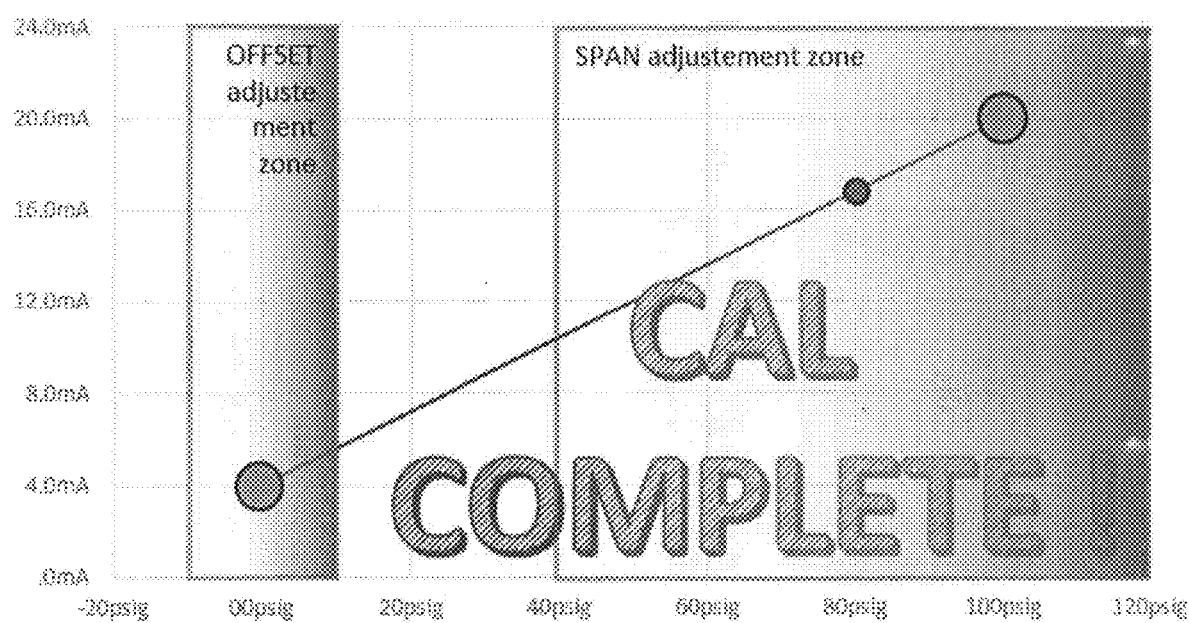

Thereafter, subsequent tapping or holding the magnet member 14 against or proximal to measuring device 10 increments output span, as shown in FIGS. 11 and 12.

It is noted that if each subsequent adjustment hits an upper adjustment limit, the adjustments to the output rolls over to a lower adjustment limit (e.g., lower adjustment limit of span), and then increments positive from the lower adjustment limit (e.g., by each subsequent tap/knock/placement of the magnet member 14 against or proximal to housing 12).

FIG. 12 depicts the output span of measuring device 10 being re-calibrated to 100 psi at 20 mA of measuring device 10 (e.g., 20 mA configured to be the maximum range of the pressure transducer 10 and is configured to correspond to a 100 psi pressure reading, within plus or minus 0.01% error).

After re-calibrating to 100 psi at 20 mA of measuring device 10, a user can remove the adjustment member from housing 14 and wait a pre-determined period of time (e.g., after about 30 seconds of last contact/placement of the magnet member 14 against or proximal to housing 12; after about 10 seconds of last contact/placement of the magnet member 14 against or proximal to housing 12; etc.).

The measuring device 10 then responds (after waiting the pre-determined period of time) by sending a first signal (e.g., a high current) and then a second signal (e.g., a low current), and thereafter exits the adjustment mode. It is noted that measuring device 10 may just send one signal, or may send a plurality of signals to signify exiting the adjustment mode.

The adjustment features (e.g., adjusting offset and/or span) of exemplary measuring device 10 via adjustment member 14 advantageously allows a user or installer to adjust or calibrate measuring device 10 or the like without breaching the housing/enclosure 12 (e.g., to gain access to trimpots or the like), which is especially beneficial in hazardous locations where intrinsic safe or explosion proof equipment may be required to prevent or contain combustion.

It is noted that the adjustment features (e.g., adjusting offset and/or span) of exemplary measuring device 10 via adjustment member 14 it also very advantageous in offering user or field calibration for any well-sealed measuring device 10, such as submersible transducers 10, hermetically sealed devices 10, or even all-welded construction devices 10 or the like.

It is noted that the timing and range of various parts or sections of these adjustment methods/processes are variable. For example, the 30 second window or time-frame after power-up may be changed to 10 seconds, or any other suitable duration.

The pressure ranges (or other input variable on similar devices 10) to distinguish between an Offset or Span adjustment can be varied or defined for custom applications.

The knock code itself may be any suitable sequence or timing/duty cycle (or even the timing for detecting morse-code for example). The annunciation signal may be embodied by some other signal(s) or sequence(s).

The magnet tap/placement may even be electromagnetic (allowing faster exercise, or more complex input sequencing/security coding, or remote adjustment). The output signal does not need to be analog—it may be digital.

Finally, the magnetic input method for external input may not be limited to Offset & Span adjustment (and secure access). For example, it may be used for manifold purposes—as a device reset, trigger input (for datalogging or a timer, for example).

The exemplary measuring devices 10 with adjustment member 14 are able to adjust both zero and span.

The exemplary measuring devices 10 with adjustment member 14 are able to perform fine adjustments throughout a wide range, rather than simply asserting/setting zero.

The exemplary measuring devices 10 with adjustment member 14 are able to perform field calibration while the device 10 is operating in a hazardous environment, rather than the device 10 having to be removed from the hazardous environment to be field calibrated.

As noted, the knock code feature prevents accidental or unauthorized adjustment and allows the feature to be implemented in such a way as to comply with the IEC-61508 standard for functional safety.

The annunciation feature (triggered when the knock code is accepted, and when calibration adjustment completes) allows a user to know with certainty that the calibration adjustment has been committed/completed/entered with respect to device 10.

The exemplary measuring devices 10 with adjustment member 14 and their associated adjustment features reduces errors associated with trimpots for Zero and Span.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:
1. A method for adjusting a measuring system comprising:
operating a process;
mounting a measuring device with respect to the process for measuring a parameter associated with the process;
applying power to the measuring device;

positioning an adjustment member against or proximal to a target area of the measuring device and within a pre-determined period of time after applying power to the measuring device to place the measuring device in an adjustment mode that enables subsequent adjustment of one or more features of the measuring device via subsequent positioning of the adjustment member against or proximal to the target area;

subsequently positioning the adjustment member against or proximal to the target area while the measuring device is in the adjustment mode to adjust one or more features of the measuring device.

2. The method of claim 1, wherein the process is operated under pressure; and wherein the measuring device is a sealed pressure measuring device.

3. The method of claim 1, wherein the measuring device is a pressure measuring device or a temperature measuring device.

4. The method of claim 1, wherein the measuring device is a pressure transducer or a pressure transmitter.

5. The method of claim 1, wherein the measuring device is a sealed signal conditioning device.

6. The method of claim 1, wherein the adjustment member is a magnet member.

7. The method of claim 1, wherein the measuring device includes a sensing element; and wherein the sensing element is a magnetically sensitive logic input device.

8. The method of claim 1, wherein the pre-determined period of time after applying power to the measuring device is about 30 seconds or less.

9. The method of claim 1, wherein the adjustment of the one or more features of the measuring device includes adjusting a digital or analog output of the measuring device.

10. The method of claim 1, wherein the adjustment of the one or more features of the measuring device includes adjusting an offset or span of the measuring device.

11. The method of claim 1, wherein the adjustment of the one or more features of the measuring device occurs without breaching an enclosure or housing of the measuring device.

12. The method of claim 1, wherein positioning the adjustment member against or proximal to the target area to place the measuring device in the adjustment mode requires a pre-determined sequenced code or placement rhythm of the adjustment member against or proximal to the target area to place the measuring device in the adjustment mode.

13. The method of claim 12, wherein the pre-determined sequenced code or placement rhythm includes two or more knocks or placements of the adjustment member against or proximal to the target area to place the measuring device in the adjustment mode.

14. The method of claim 1, wherein the measuring device sends a first signal and a second signal prior to entering the adjustment mode.

15. The method of claim 1, wherein the adjustment mode switches between operating or functioning on adjusting a first feature of the measuring device, and operating or functioning on adjusting a second feature of the measuring device, depending on the numerical or percentage value of the parameter of the process that is applied to the measuring device.

16. The method of claim 15, wherein the process is operated under pressure;

wherein adjusting the first feature includes adjusting an offset of the measuring device; and wherein adjusting the second feature includes adjusting a span of the measuring device.

17. The method of claim 16, wherein the adjustment mode switches between adjusting the first and second features depending on the percent of pressure that is applied to the measuring device.

18. The method of claim 1, wherein when the measuring device is operated in a first parameter range of the process, a first feature of the measuring device can be adjusted by subsequently positioning the adjustment member against or proximal to the target area; and wherein when the measuring device is operated in a second parameter range of the process, a second feature of the measuring device can be adjusted by subsequently positioning the adjustment member against or proximal to the target area.

19. The method of claim 1, wherein the process is operated under pressure;

wherein adjusting the first feature includes adjusting an offset of the measuring device; and wherein adjusting the second feature includes adjusting a span of the measuring device.

20. The method of claim 18, wherein the first parameter range of the process is from about plus 10% pressure to about minus 10% pressure that is applied to the measuring device; and wherein the second parameter range of the process is about 40% or greater pressure that is applied to the measuring device.

21. The method of claim 1, wherein each subsequent positioning of the adjustment member against or proximal to the target area while the measuring device is in the adjustment mode incrementally adjusts one or more features of the measuring device.

22. The method of claim 21, wherein after a plurality of positive incremental adjustments of the one or more features reaches an upper adjustment limit, the next subsequent positioning of the adjustment member against or proximal to the target area sends the next incremental adjustment to a lower adjustment limit, and then the next subsequent adjustment increments positively from the lower adjustment limit.

23. The method of claim 1, wherein after the measuring device is in the adjustment mode and after a time-frame of inactivity of positioning the adjustment member against or proximal to the target area, the measuring device enters a non-adjustment mode.

24. The method of claim 23, wherein the measuring device sends a first signal and a second signal after entering the non-adjustment mode.

25. A method for adjusting a measuring system comprising:

operating a process;

mounting a measuring device with respect to the process for measuring a parameter associated with the process;

applying power to the measuring device;

positioning an adjustment member against or proximal to a target area of the measuring device and within a pre-determined period of time after applying power to the measuring device to place the measuring device in an adjustment mode that enables subsequent adjustment of one or more features of the measuring device via subsequent positioning of the adjustment member against or proximal to the target area;

subsequently positioning the adjustment member against or proximal to the target area while the measuring device is in the adjustment mode to adjust one or more features of the measuring device;

wherein the measuring device is a sealed signal conditioning device;

wherein the measuring device sends at least a first signal prior to entering the adjustment mode;

wherein when the measuring device is operated in a first parameter range of the process, a first feature of the measuring device can be adjusted by subsequently positioning the adjustment member against or proximal to the target area;

wherein when the measuring device is operated in a second parameter range of the process, a second feature of the measuring device can be adjusted by subsequently positioning the adjustment member against or proximal to the target area;

wherein each subsequent positioning of the adjustment member against or proximal to the target area while the measuring device is in the adjustment mode incrementally adjusts one or more features of the measuring device; and wherein after the measuring device is in the adjustment mode and after a time-frame of inactivity of positioning the adjustment member against or proximal to the target area, the measuring device enters a non-adjustment mode.

26. A method for adjusting a pressure measuring system comprising:

operating a process under pressure;

mounting a pressure measuring device with respect to the process for measuring pressure associated with the process;

applying power to the pressure measuring device;

positioning a magnet member against or proximal to a target area of the pressure measuring device and within a pre-determined period of time after applying power to the pressure measuring device to place the pressure measuring device in an adjustment mode that enables subsequent adjustment of offset or span of the pressure measuring device via subsequent positioning of the magnet member against or proximal to the target area;

subsequently positioning the magnet member against or proximal to the target area while the pressure measuring device is in the adjustment mode to adjust offset or span of the measuring device;

wherein positioning the magnet member against or proximal to the target area to place the pressure measuring device in the adjustment mode requires a pre-determined sequenced code or placement rhythm of the magnet member against or proximal to the target area to place the pressure measuring device in the adjustment mode;

wherein the adjustment of the offset or span of the pressure measuring device occurs without breaching an enclosure or housing of the pressure measuring device.

* * * * *